Figure 1:
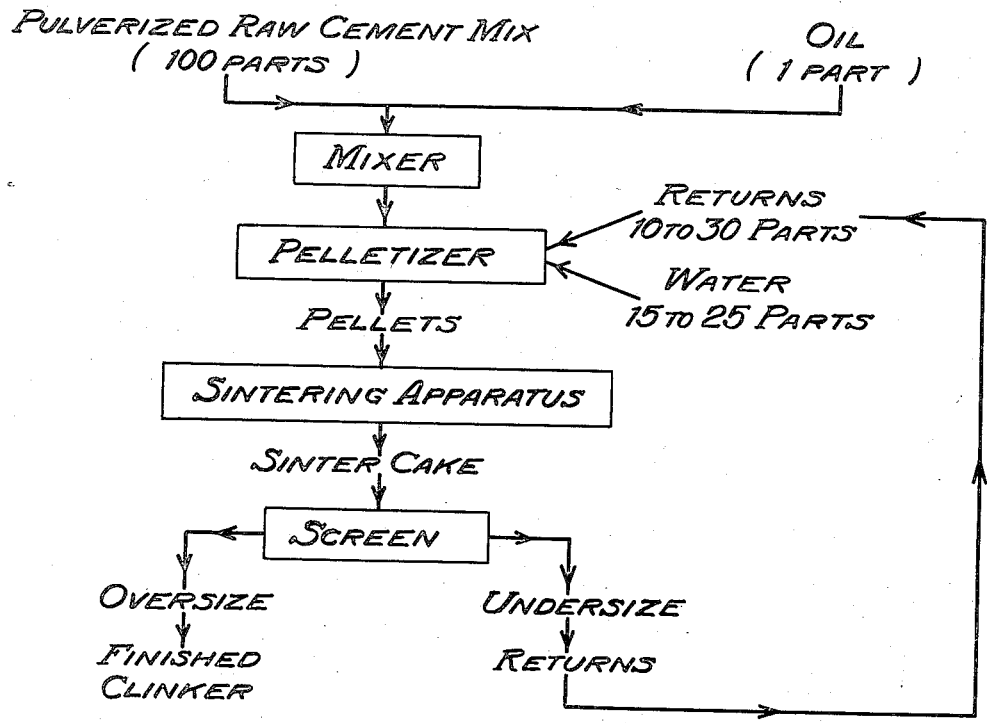

Patented Dec. 17, 1935

2,024,176

UNITED STATES PATENT OFFICE 2,024,176

METHOD OF SINTERING

Thorne E. Lloyd, Netcong, N. J., assignor to Dwight & Lloyd Sintering Company, Inc., New York, N. Y., a corporation of Delaware Application December 11, 1934, Serial No. 756,922

10 Claims. (Cl. 106—25)

My invention relates to methods of sintering finely divided materials such as raw cement mixes, and to the sintering and manufacturing of cement and similar materials.

Many materials are difficult to sinter when in a fine state of subdivision even though they may be readily sinterable when in larger particle size. This difficulty in sintering of the fine materials as heretofore prepared has been due to the formation of a dense rather impermeable bed on a sintering machine through which it is practically impossible to pass air currents in the volume required for proper sintering. In some cases the moisture content of the sintered charge requires an extremely close and accurate regulation that has been heretofore impossible to attain in commercial operation. When attempts have been made to sinter such materials the result has usually been a product of poor character and of irregular quality with occasional pieces of good sinter but with large proportions of unsintered or poorly sintered product.

In order to sinter materials of this nature it has heretofore been necessary to mix them with other materials either of a coarser size or of a more readily sinterable nature, or else to mix with the original raw material a large proportion of poorly sintered product. The dilution with other materials is only rarely available because diluents of a nature that are harmless in the finished product are not generally available. The return of poorly sintered product, on the other hand, involves repeated treatment of a part of the charge and results in decreased output and increased cost for treatment.

In burning cement either in a rotary kiln or on a sintering machine such as that of the Dwight-Lloyd type, it has been proposed to form the pulverized raw materials into small nodules or pellets and to burn these pellets to convert the raw materials into cement clinker. This preliminary pelletizing or nodulizing has been found to be a difficult operation to perform as the pulverized raw materials do not readily form into nodules and, even when so formed, the nodules are of varying size which results in irregularity in burning, and also are extremely fragile so that the charge tends to break down to dust while being burned, particularly if the burning is conducted in a rotary kiln in which it is continuously subjected to abrasion by agitation and tumbling as the kiln revolves.

In my present invention the above difficulties are overcome and a method is provided whereby finely ground or finely divided materials of various types, including raw cement mixes, may readily be pelletized or formed into pellets of uniform and controllable size and of sufficient mechanical strength to resist breakage. Accordingly, when sintered, the pellets sinter to a uniform sintered product.

In my invention the finely divided material is mixed with a small amount of an oily or greasy material and moistened with water and then rolled into small pellets. The oil or grease, and water for moistening the material, may be incorporated in the material in any desired sequence, but this incorporation is preferably and most conveniently accomplished by first thoroughly mixing the oil or grease with the substantially dry material and then adding and mixing the water to the required consistency. The moistened material is then fed to a drum pelletizer, or other similar apparatus, which rolls the moistened material into small pellets of uniform size. The oil may readily be applied to the fine material in the form of a spray by atomizing with air. Steam or hot gases may be used for atomizing and are especially helpful with heavy oils and greases, as the heat increases the fluidity and facilitates mixing. It has also been found that the oil may be made into an emulsion with water and a small proportion of the fine material and that this thin mud or slime may be readily mixed with the remaining raw material.

Various types of oil or grease may be employed as, for example, crude petroleum, light fuel oil, bunker oil and various heavy greases, and all give good results. The quantity of oil or grease required may vary with different material and with different degrees of fineness. Generally, a quantity of oil equal to ½% to 1½% of the weight of raw material has been found sufficient.

In general, the finer the material, the larger the quantity of oil required, and for a material of given fineness, somewhat smaller quantities of heavy greases are sometimes required than if lighter oils are employed. As bunker oil is satisfactory and is cheapest, it is generally preferable.

A complete mixing of the oil and dry material so that the oil is brought into contact with each particle of fine material is desirable. A sufficiently uniform and thorough mixing may, however, be obtained by using a pugmill or drum mixer. Water is then added to the oiled material until the desired consistency is obtained. Generally this will require an amount of water equal to from 13½% to 21% or, in the case of a raw cement mix, from 15½% to 21%. The quantity of water employed must not be sufficient to form the material into a fluid mud.

The moistened mixture is then formed into pellets by agitating or rolling it for a short period in any suitable type of apparatus such as a drum pelletizer. The oil and water cause the material to roll into pellets of substantially uniform size. For example, a material that without oil treatment forms pellets varying from 4 mesh to minus 20 mesh size forms, when given the preliminary oil treatment, pellets from 6 to 8 mesh size with practically no over-size or under-size. The pellets thus formed also have a much greater mechanical strength and, when subsequently sintered, form a uniformly permeable bed so that the sintering action proceeds evenly throughout. Less water is required for moistening the oiled material and the proportion of water used does not need such close or careful regulation as is required for unoiled material. Consequently the preparation of the charge is easier and requires less supervision.

The formation of the material into uniform strong pellets also provides a charge that requires less volume on the sintering apparatus so that there are less shrinkage and cavities and a stronger sinter cake is produced.

In pelletizing certain materials, such as raw cement mixes, the size of the pellets increases with the length of rolling or pelletizing and, therefore, may be controlled or regulated. In case such pellets are to be sintered in a rotary kiln, the prepared pellets may be charged into the kiln directly. When heated, some smoke appears as the oil burns but the strength of the pellets is retained and may even be increased so that the dust loss is greatly reduced as compared with ordinary practice. When the sintering operation is conducted on an internal combustion apparatus in which the heat is supplied by fuel burning within the sintering bed, as in the Dwight-Lloyd sintering machine, it is necessary to add the fuel before the raw materials are fed to the sintering machine. This is accomplished by mixing finely divided solid fuel, such as anthracite fines, coke breeze, etc., to the pelletized raw material and mixing the two whereby the particles of fuel become mixed with and partially attached to the surfaces of the pellets. The mixture thus prepared may then be charged to the sintering machine, the fuel ignited and the bed sintered in the usual way.

Examples of the process or method are as follows—

*Example I*

Dolomite pulverized to pass 85% through a 200 mesh screen together with 4% of fine mill scale is treated with 1¼% of bunker oil and thoroughly mixed therewith. This mixture is then moistened with 13½% of water and pulverized to nodules of from about 6 to 8 mesh size. Fine anthracite coal equal to 18% of the charge is added and the charge placed on the grates of the sintering apparatus in a bed 5 inches deep and weighing 24 pounds (dry weight) per square foot of grate area. This bed is ignited and sintered, a vacuum or pressure difference of 4 inches of water being sufficient to draw the required air through the bed. A strong hard sinter of excellent quality was produced in eight minutes, time. This is in contrast to a similar charge which, without oil treatment required 19% of water in pelletizing, formed pellets of from 4 mesh to minus 20 mesh size, required a pressure or vacuum of 8 inches of water to create a sufficient draft, and give an irregular product, only one-third of which was satisfactory sinter.

*Example II*

In making a raw cement mix for sintering, a quantity of returned material may be added. In the following example, 10% of fines of sintered material, for example, minus 6 or 4 mesh are added to the oiled raw cement mix as it passes to the pelletizer for moistening and pelletizing. In this case the oil used was bunker oil and constituted 1¼% of the raw cement mixture. After pelletizing, anthracite fines were added in amount equal to 10% of the raw cement mix, and the material charged onto a sintering machine at the rate of 20 pounds to 1 square foot of hearth area. The material was burned in 14 minutes, thus giving a production of 86 pounds per hour. A comparable test run without oiling required 15 pounds of coal for each 100 pounds of raw cement mixture, and required 18 minutes to burn, and was limited to 17½ pounds per square foot of hearth area, giving a total output per square foot of hearth area of 58 pounds per hour.

By the present method, therefore, the output was increased 48% and the coal consumption decreased 50%.

Figure 2:
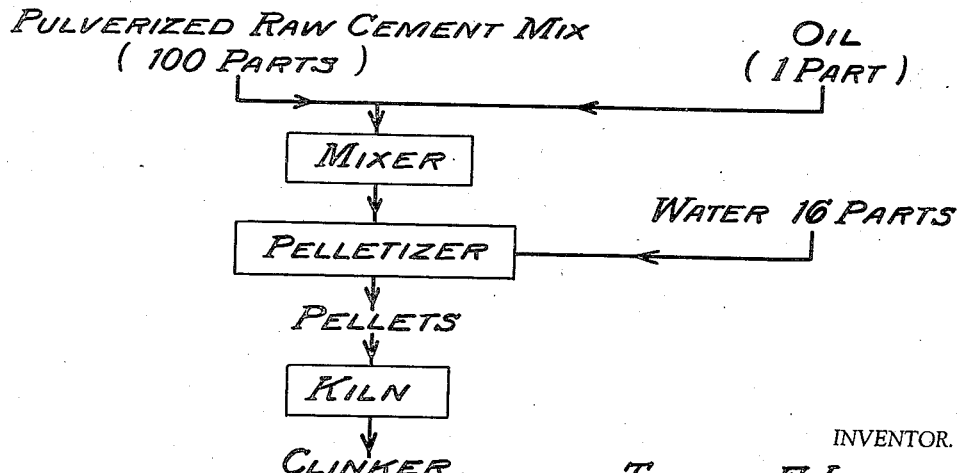

Flow sheets for the process of cement burning in rotary kilns and on sintering machines are given in Figs. 1 and 2, respectively, of the accompanying drawing.

What I claim is —

1. A method of forming finely divided material into pellets which comprises mixing said materials with a small quantity of oily material and with a quantity of water insufficient to render the mixture fluid, and rolling the mixture containing the water and oil to form pellets.

2. A method of forming finely divided mineral material into pellets which comprises mixing said material with a small quantity of oily material and then mixing the oiled material with a quantity of water insufficient to render the mixture fluid, and rolling the mixture containing the water and oil to form pellets.

3. A method of forming finely divided mineral material into pellets which comprises mixing said material with between ½% and 1½% of oily material, then mixing the mixture with a quantity of water insufficient to render the mixture fluid, and rolling the mixture containing the water and oil to form pellets.

4. A method of forming finely divided mineral material into pellets which comprises mixing said material with between ½% and 1½% of its weight of oily material, then mixing the resulting mixture with water in amount between 13½% to 21% of the weight of said mixture, and rolling the resulting moistened and oiled mixture into pellets.

5. A method of preparing a raw cement mix which comprises mixing finely divided cement-mix with a small quantity of oily material and with a quantity of water insufficient to render the mixture containing the water and oil a fluid mud, and rolling the mixture to form pellets.

6. A method of manufacturing cement which comprises mixing finely divided cement forming materials with a small quantity of oily material and with water insufficient to form a fluid mud, rolling the resulting moist and oiled mixture to form pellets, and sintering said pellets.

7. A method of manufacturing cement which comprises mixing finely divided cement forming materials with a small quantity of oily material and with water insufficient to form a fluid mud, rolling the resulting moist and oiled mixture to form pellets, and sintering said pellets in a quiescent bed.

8. A method of manufacturing cement which comprises mixing finely divided cement forming material with a small quantity of oily material and with water insufficient to form a fluid mud, rolling the resulting moist and oiled mixture to form pellets, and sintering said pellets while agitating.

9. A method of making cement which comprises mixing finely divided cement forming material with a small quantity of oily material and with a quantity of water insufficient to form a fluid mud, rolling the mixture containing the water and oil to form pellets, adding finely divided fuel to the outer surfaces of said pellets, and sintering the resulting pellets and fuel mixture.

10. A method of making cement which comprises mixing finely divided cement forming material with an oily material equal to between $\frac{1}{2}\%$ and $1\frac{1}{2}\%$ of the weight of said cement forming materials, adding a quantity of water to the resulting oiled mixture to moisten the latter without forming a fluid mud, rolling the moistened and oiled mixture into pellets, forming a coating of fuel on said pellets, and sintering said pellets.

THORNE E. LLOYD.